United States Patent
Herrick et al.

(10) Patent No.: US 9,834,371 B2
(45) Date of Patent: Dec. 5, 2017

(54) CAT LITTER CONTAINER WITH TWO HANDLES AND A POURING SPOUT

(71) Applicants: Joseph Herrick, Westlake Village, CA (US); Betsy Martin, Westlake Village, CA (US)

(72) Inventors: Joseph Herrick, Westlake Village, CA (US); Betsy Martin, Westlake Village, CA (US)

(73) Assignee: Lucy Pet Products, LLC, Westlake Village, CA (US)

( * ) Notice: Subject to any disclaimer, the term of this patent is extended or adjusted under 35 U.S.C. 154(b) by 0 days.

(21) Appl. No.: 14/934,087

(22) Filed: Nov. 5, 2015

(65) Prior Publication Data

US 2017/0088344 A1    Mar. 30, 2017

Related U.S. Application Data

(60) Provisional application No. 62/233,986, filed on Sep. 28, 2015.

(51) Int. Cl.
| | |
|---|---|
| B65D 47/12 | (2006.01) |
| B65D 85/00 | (2006.01) |
| B65D 75/56 | (2006.01) |
| B65D 75/58 | (2006.01) |
| B65D 83/06 | (2006.01) |
| A01K 1/01 | (2006.01) |
| B65D 81/36 | (2006.01) |
| B65D 33/08 | (2006.01) |

(52) U.S. Cl.
CPC ............ *B65D 85/70* (2013.01); *A01K 1/0107* (2013.01); *B65D 47/122* (2013.01); *B65D 75/563* (2013.01); *B65D 75/566* (2013.01); *B65D 75/5883* (2013.01); *B65D 81/365* (2013.01); *B65D 83/06* (2013.01); *B65D 33/08* (2013.01)

(58) Field of Classification Search
CPC .... B65D 33/08; B65D 47/122; B65D 75/566; B65D 75/5883; B65D 83/06; B65D 85/70
See application file for complete search history.

(56) References Cited

U.S. PATENT DOCUMENTS

| | | | | |
|---|---|---|---|---|
| 1,849,950 | A | * | 3/1932 | Murdock ............... B65D 47/16 141/309 |
| 3,195,752 | A | * | 7/1965 | Cox ..................... B65D 1/0223 141/98 |
| 4,073,397 | A | * | 2/1978 | Snodgrass ............ B65D 81/365 215/385 |
| 4,909,392 | A | * | 3/1990 | Williams ........... B65D 21/0202 206/509 |
| 4,928,860 | A | * | 5/1990 | Knight .................... B65D 1/18 215/370 |

(Continued)

*Primary Examiner* — Frederick C Nicolas
*Assistant Examiner* — Bob Zadeh
(74) *Attorney, Agent, or Firm* — Thomas I. Rozsa

(57) ABSTRACT

An improved cat litter container which includes two handles to hold the cat litter container, an upper handle which can be grasped with one hand and a side handle in the design of a cat's tail to be held in the opposite hand so that a person is able to retain the cat litter container in two hands. The cat litter container also includes a pouring spout affixed into a body of the container and extending from an interior of the container to an exterior opening where the pouring spout is closed by a cap.

16 Claims, 10 Drawing Sheets

(56) References Cited

U.S. PATENT DOCUMENTS

| | | | | |
|---|---|---|---|---|
| 5,056,691 | A | * | 10/1991 | Tolbert .................. B65D 25/385 |
| | | | | 222/466 |
| 5,226,574 | A | * | 7/1993 | Durinzi, Jr. ............. B65D 25/42 |
| | | | | 215/384 |
| D347,573 | S | | 6/1994 | Bishop |
| 5,560,506 | A | * | 10/1996 | Yanagisawa .......... B29C 31/008 |
| | | | | 215/396 |
| D424,158 | S | | 5/2000 | Besecke |
| 7,089,975 | B2 | * | 8/2006 | Chrisco .................. B67D 7/005 |
| | | | | 141/285 |
| 8,322,923 | B2 | | 12/2012 | Gum |
| D693,225 | S | * | 11/2013 | Baker ............................ D9/528 |
| 8,597,168 | B2 | | 12/2013 | Koesters et al. |
| 8,794,833 | B2 | | 8/2014 | Runyan et al. |
| 9,334,085 | B2 | * | 5/2016 | Persson .............. B65D 25/2885 |
| 2002/0102032 | A1 | | 8/2002 | Sturgis |
| 2006/0278554 | A1 | | 12/2006 | Tanaka et al. |
| 2010/0296754 | A1 | * | 11/2010 | Chiu .................... B65D 33/105 |
| | | | | 383/10 |
| 2011/0033133 | A1 | | 2/2011 | Kujat |
| 2014/0367295 | A1 | * | 12/2014 | Murray .................... B31B 1/00 |
| | | | | 206/459.5 |
| 2015/0210446 | A1 | * | 7/2015 | Wilkins .................... B65D 1/20 |
| | | | | 222/153.14 |
| 2017/0088344 | A1 | * | 3/2017 | Herrick ................ B65D 47/122 |

* cited by examiner

CAT LITTER CONTAINER WITH TWO HANDLES AND A POURING SPOUT

CROSS-REFERENCE TO RELATED APPLICATION

This patent application claims priority to Provisional Application No. 62/233,986 filed on Sep. 28, 2015.

BACKGROUND OF THE INVENTION

1. Field of the Invention

The present invention relates to the field of cat litter and in particular, to containers which retain cat litter which is used in cat litter boxes for individuals who keep cats as pets or for individuals who care about feral cats and provide them with food and cat litter boxes.

2. Description of the Prior Art

The following ten patents and published patent Applications are the closest prior art references known to the inventors.

1. U.S. Pat. No. 4,073,397 issued to Elvia E. Snodgrass on Feb. 14, 1978 for "Fowl-Shaped Container" (hereafter the "Snodgrass Patent");
2. U.S. Design Pat. No. Des. 347,573 issued to Charles W. F. Bishop on Jun. 7, 1994 for "Container" (hereafter the "Bishop Design Patent");
3. U.S. Design Pat. No. Des. 424,158 issued to Edmund E. Besecke on May 2, 2000 for "Animal Shaped Container and Watering Can" (hereafter the "Besecke Design Patent");
4. United States Published Patent Application No. 2002/0102032 to Sheldon Sturgis et al. published on Aug. 1, 2002 for "Bag with Ergonomically Disposed Handle" (hereafter the "Sturgis Published Patent Application");
5. United States Published Patent Application No. 2006/0278554 to Tanaka et al. published on Dec. 14, 2006 for "Multi-Purpose Air-Packaging Method and System" (hereafter the "Tanaka Published Patent Application").
6. United States Published Patent Application No. 2010/0296754 to Manuel Chiu published on Nov. 25, 2010 for "Auxiliary Grip for Heavy Duty Bags" (hereafter the "Chiu Published Patent Application");
7. United States Published Patent Application No. 2011/0033133 to Marcus Kujat published on Feb. 10, 2011 for "Sheet-Material Packaging Bag" (hereafter the "Kujat Published Patent Application");
8. U.S. Pat. No. 8,322,923 issued to Mark W. Gum on Dec. 4, 2012 for "Film Bag with Handle" (hereafter the "Gum Patent");
9. U.S. Pat. No. 8,597,168 issued to Jens Koesters et al. on Dec. 3, 2013 for "Method of Making Bag with Handle on Side Gusset" (hereafter the "Koesters Patent");
10. U.S. Pat. No. 8,794,833 issued to Michael Ray Runyon et al. on Aug. 5, 2014 for "Two-Handled Bag" (hereafter the "Runyon Patent").

The Runyon Patent issued on Aug. 5, 2014. Referring to Column 3 Line 13 through 22 the patent states:

"Handle 36 comprises a patch 38 that is heat-sealed to the first flap 34. Patch 38 could be heat-sealed on either side of the first flap 34 (i.e., on front panel 12 or on back panel 14), or on both sides if extra strength is required. Patch 38 can be any material typically used for bags carrying bulk products, including plastics such as linear low density polyethylene (LLPDE). A C-shaped grip 40 is formed through patch 38 and first flap 34 to form opening 42, through which a user may place his or her fingers during carrying, pouring, etc."

Further, C-shaped grip 40a is then cut through the patch 38a and a second flap 50 forming a handle 36a which primarily serves as the pouring handle. In the embodiments where the third handle 36b is included, that handle can be formed in a similar manner.

The Sturgis Patent discloses the concept of having a handle in two places.

The Snodgrass Patent discloses a fowl-shaped container but has only one handle.

The Bishop Design Patent is a design Patent on a container. It does not show any handles and it appears to have a pouring spout on the top.

The Besecke Design Patent protects the shape of an animal-shaped container and watering can. It only has one handle.

The Tanaka Published Patent Application discloses a multi-purpose air packaging method and system.

The Chiu Published Patent Application discloses the concept of having one handle on top and it is possible that the bottom could be construed as a handle.

The Kujat Published Patent Application discloses a bag made of metal.

The Gum Patent discloses a one-handle container for storing film.

The Koesters Patent discloses two handles on the side of the package.

Most cat litter containers are either in the form of a cardboard box with an opening that can be pushed open to pour cat litter out of the box, or, alternatively, are in a bag which is usually made of strong flexible material so that the bag can be cut open or torn open to facilitate dispensing of cat litter. The problem with existing cat litter containers, whether they are in flexible material form or in hard box form, is that they are not embodied with easy-to-use handles to enable the cat litter to be poured from the dispensing area of the cat litter container. Further, cat litter will frequently spill out of the box and onto the floor if the individual is not careful about how the cat litter is dispensed from the container. There is a significant need for an improved cat litter container which enables the cat litter container to be securely held by a person and have the cat litter dispensed in an organized and efficient manner so that no excess litter is dispensed and no cat litter is accidently spilled on the floor outside of the cat litter box.

SUMMARY OF THE INVENTION

The present invention is an improved cat litter container which includes two handles to hold the cat litter container, an upper handle which can be grasped with one hand and a side handle in the design of a cat's tail to be held in the opposite hand so that a person is able to retain the cat litter container in two hands. The first or upper handle is formed into the cat litter container and adjacent the middle top area of the container and the second or side handle is formed into the container adjacent a side area of the container, with a cat's tail encircling part of the handle. Each handle is an opening in the container. A reinforcing member such as a hard plastic reinforcing member is inserted into the opening of the handle and is affixed to the handle at an exterior circumference of the handle and the adjacent portion of the cat litter container. The cat litter container also includes a pouring spout affixed into a body of the container and extending from an interior of the container to an exterior opening where the pouring spout is closed by a cap. By way of example, the pouring spout is one and half (1½) inches to accommodate fine small cat litter. If the container has larger contents, the diameter of the pouring spout may be three (3) inches. The pouring spout is preferably at a side of the container opposite the side in which the side handle is located.

Discussed in greater detail, a further improvement of the present invention is the incorporation of a pouring spout embedded into the cat litter container with a threaded retaining cap which can be unscrewed to have the pouring spout opening in place so that the cat litter will be in direct communication with the pouring spout opening to enable the cat litter to be dispensed out of the pouring spout and into the cat litter container. An additional embellishment is to have an optional frangible seal on the opening of the pouring spout which must be broken in order to enable a user to dispense cat litter from the container to which the end of the pouring spout is inserted.

Therefore, it is an object of the present invention to have an improved cat litter container which includes two handles to hold the cat litter container, an upper handle (which may be located between a cat's ears on the packaging design) which can be grasped with one hand and a side handle (which may be located within a cat's tail in a packaging design) in the design of a cat's tail to be held in the opposite hand so that a person is able to retain the cat litter container in two hands. The first or upper handle is formed into the cat litter container and adjacent the middle top area of the container and the second or side handle is formed into the container adjacent a side area of the container, with a cat's tail forming part of the handle. Each handle is an opening in the container.

It is a further object of the present invention for the handles of the cat litter container to include a reinforcing member such as a hard plastic reinforcing member which is inserted into the opening of the handle and is affixed to the handle at an interior circumference of the handle and the adjacent portion of the cat litter container.

It is also within the spirit and scope of the present invention for the container to be used in conjunction with other pet industry related products.

It is an additional object of the present invention for the cat litter container to also include a pouring spout affixed into a body of the container and extend from an interior of the container to an exterior opening where the pouring spout is closed by a cap. By way of example, the pouring spout is one and half (1½) inches in diameter to accommodate fine small cat litter. If the container has larger contents, the diameter of the pouring spout may be three (3) inches. The pouring spout is preferably at a side of the container opposite the side in which the side handle is located.

Defined in detail, the present invention is a container used in conjunction with cat litter, the container comprising: (a) a body having exterior walls including a front surface, a rear surface, a first sidewall surface, a second sidewall surface, a top surface and a bottom surface encircling an interior chamber; (b) an upper handle section having a lower portion and an upper portion, the lower portion affixed at an upper section of the body and the upper portion extending above the top surface to expose an upper handle including an opening surrounded by an interior upper circumferential wall with an upper reinforcing member affixed onto the interior upper circumferential wall; (c) a side handle section including a spacer section between the second sidewall and a side handle to expose the side handle including an opening surrounded by an interior side circumferential wall with a side reinforcing member affixed onto the interior side circumferential wall; and (d) the body containing a pouring spout affixed into the first sidewall, the pouring spout in fluid communication with said interior chamber, the pouring spout including a threaded cap; (e) whereby cat litter is retained in said interior chamber and when said threaded cap is removed, the container is held by a user inserting fingers of a first hand through said opening in said upper handle and a palm of the first hand around said upper handle and the container is further held by a user inserting fingers of a second hand through said opening in said side handle and the palm of a second hand around said side handle, and cat litter is poured out of said pouring spout while the container is held by two separate hands.

Defined more broadly, the present invention is a container used in conjunction with cat litter, the container comprising: (a) a body having exterior walls enclosing an interior chamber; (b) an upper handle section affixed adjacent an upper wall section of said exterior walls and including an upper handle positioned out of said body to expose an opening surrounded by an interior upper circumferential wall with an upper reinforcing member affixed onto the interior upper circumference wall; (c) a side handle section including a spacer section affixed to and located between a second sidewall and a side handle to expose an opening surrounded by an interior side circumferential wall with a side reinforcing member affixed onto the interior side circumferential wall; and (d) the body containing a pouring spout affixed into a portion of said exterior walls remote from said side handle, the pouring spout in fluid communication with said interior chamber; (e) whereby cat litter is retained in said interior chamber and the container is held by a user inserting fingers of a first hand through said opening in said upper handle and the user inserting fingers of a second hand through said opening in said side handle, and cat litter is poured out of said pouring spout while the container is held by at least fingers of two separate hands.

Further novel features and other objects of the present invention will become apparent from the following detailed description and discussion.

BRIEF DESCRIPTION OF THE DRAWINGS

Referring particularly to the drawings for the purpose of illustration only and not limitation, there is illustrated.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention.

Figure 1:
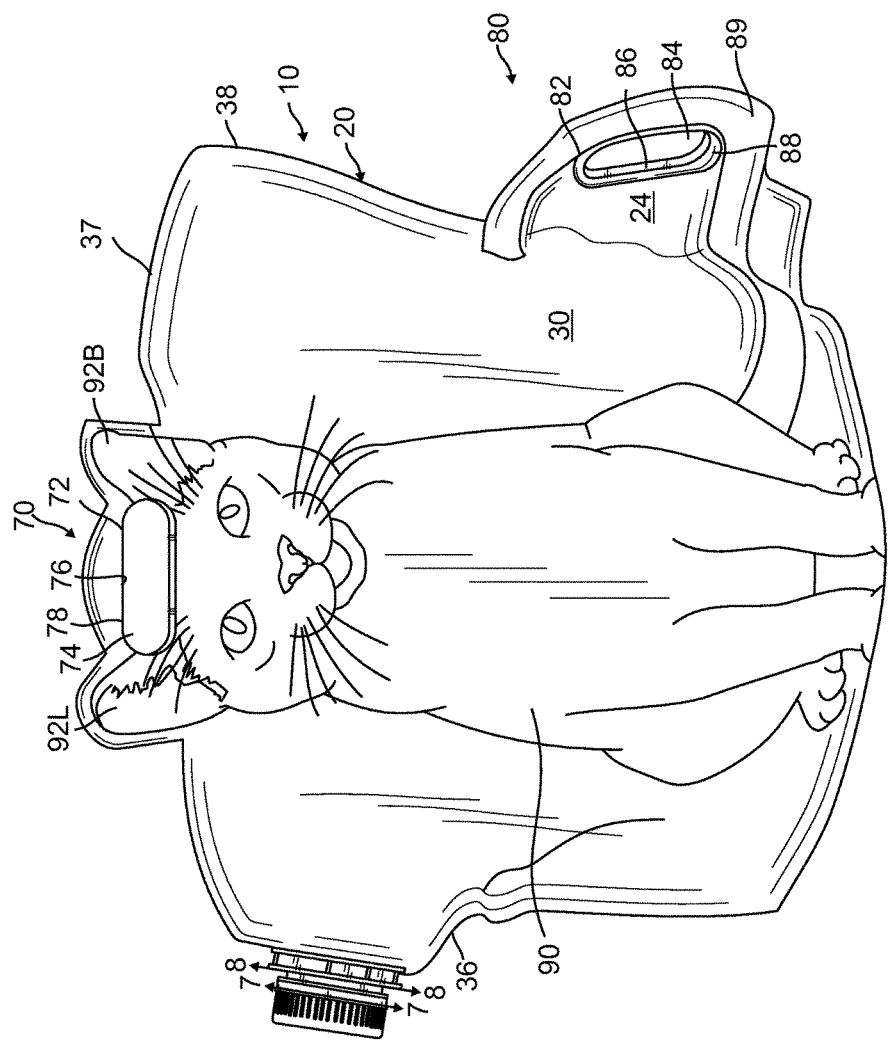
FIG. 1 is a front elevational view of the present invention cat litter container with two handles and a pouring spout showing the present invention.
Figure 6:
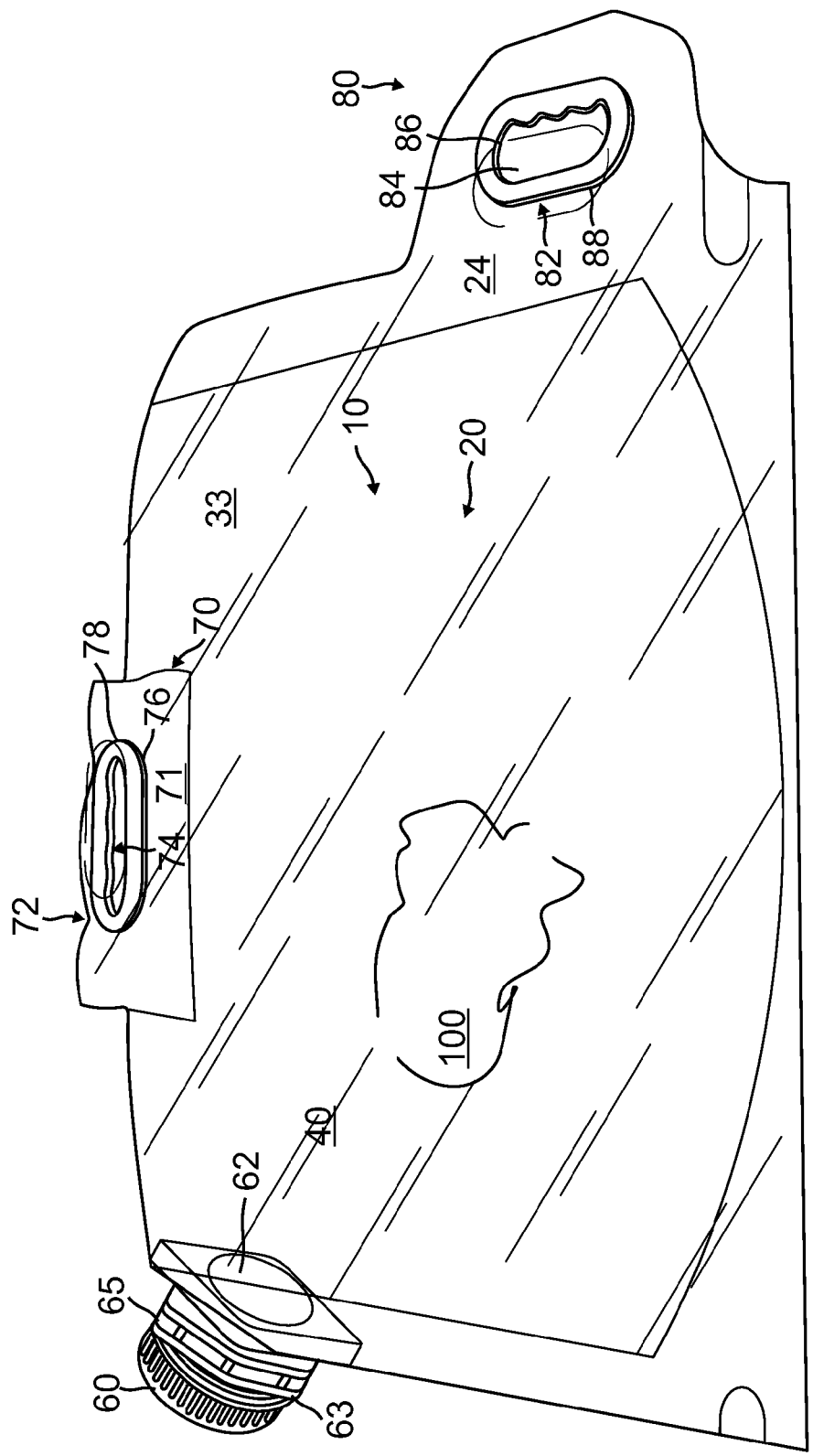
FIG. 6 is a transparent front elevational view of the present invention cat litter container with two handles and a pouring spout shown without any opaque color on the exterior surfaces to better illustrate the components of the present invention.

Referring to FIGS. 1-6, there is illustrated an embodiment of the present invention cat litter container 10 which has a cat litter body 20 (also referred to as body) which can either be made of hard non-bendable material or soft flexible plastic or other plastic-like material. The cat litter body 20 contains an exterior front surface 30 which can be the shape as depicted in FIG. 1 or can be any other shape having the following surfaces: an exterior front surface 30, an exterior rear surface 32, a first or left sidewall 36, a second or right sidewall 38, a top surface 37 and a bottom surface 31. All of these surfaces surround an interior chamber 40 as illustrated in the transparent view of FIG. 6, this transparent view also illustrating the cat litter 100 within interior chamber 40. Located on first sidewall 36 of the cat litter container 10 is a pouring spout 50 which contains a removable closure member 60 (which is alternatively called a cap, threaded cap, sealing cap or a press fit cap) which threads onto the threads 63 of the pouring spout 50 (see FIG. 6). As illustrated in FIG. 6, the pouring spout 50 has a hollow cylindrical wall 62 which is affixed to and in fluid communication with the pouring spout 50. The cylindrical wall 62 extends into the interior chamber 40 of the cat litter container 10 and is in direct contact with a portion of the cat litter 100. A pouring spout frame 65 facilitates a secure connection between the pouring spout 50 and the first side wall 36 of the cat litter body 20 of the cat litter container 10.

Figure 7:
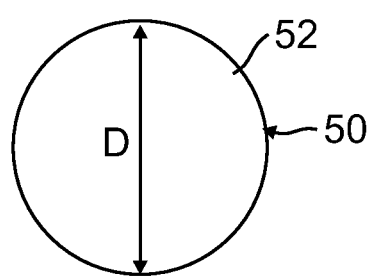
FIG. 7 is a cross-sectional view taken along line 7-7 of FIG. 1.
Figure 8:
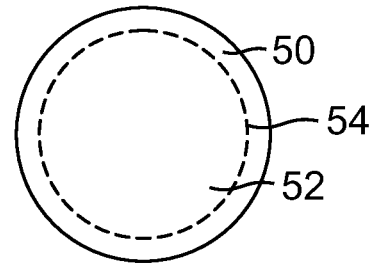
FIG. 8 is a cross-sectional view taken along 8-8 of FIG. 1.

Referring to FIG. 7 (which is a cross-sectional view taken along Line 7-7 of FIG. 1), when the removable closure member 60 is removed, the pouring spout 50 is open and has an opening 52 which leads to the interior 40 of the cat litter body 20 (as illustrated in FIG. 6). Therefore, one of the innovations of the present invention is to have a pouring spout 50 by which the cat litter 100 is efficiently removed from the cat litter container 10. In addition, as another variation, the pouring spout 50 can have frangible seal 54 placed over its opening 52 as illustrated in FIG. 8 (which is a cross-sectional view taken along Line 8-8 of FIG. 1) and then the threaded cap 60 is placed by mating affixation members such as mating threads on the cap with threads 63 on the pouring spout 50 or alternatively, the threaded cap 60 is press fit retained onto pouring spout 50 or any other joining members by which the cap is affixed to the opening of the pouring spout 50. The diameter "D" of the pouring spout can range from 1 inch to 2 inches and is preferably 1½ inches for cat litter. For larger products contained within chamber 40, the diameter of the pouring spout 50 is three inches.

Figure 9:
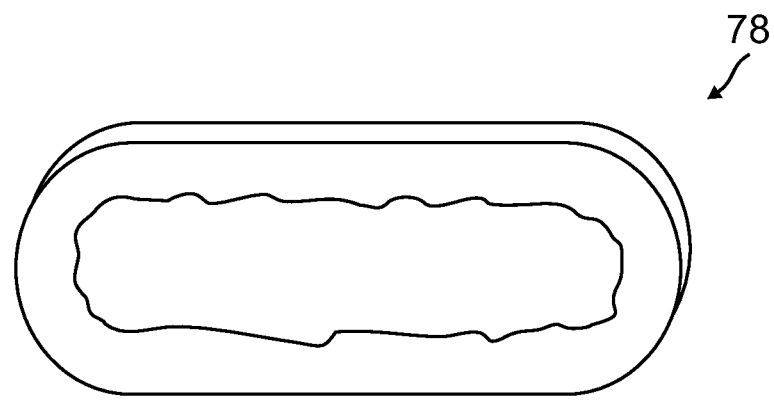
FIG. 9 is an elevational view of the reinforcing member used with each handle, the reinforcing member of the left handle illustrated for example in FIG. 9.

Referring to FIGS. 1-6, an additional innovation of the present invention is having two retaining sections by which the cat litter container 10 is held by both hands of a person. A first upper section 70 of the cat litter body 20 includes an upper handle 72 including an interior upper circumferential wall 76 and reinforcing member 78 surrounding an opening in the upper handle also referred to upper handle opening 74 bounded by the reinforcing member 78 and interior upper circumferential wall 76 of upper handle 72 within an upper section 70. Upper handle 72 includes a first upper reinforcing member 78 which is a plastic strengthening member affixed onto the interior upper circumferential wall 76 so that reinforcing member 78 surrounds upper handle opening 74. The plastic reinforcing member 78 and interior upper circumferential wall 76 with the upper handle opening 74 enables a person's hand to be inserted through the upper handle opening 74 and then the palm and fingers of the hand wrapped around the interior upper circumferential wall 76 and first strengthening member 78 of first upper handle 72. As illustrated in FIGS. 1 and 6, the location of this first handle section 70 which comprises upper handle 72 with interior upper circumferential wall 76 and strengthening member 78 surrounding upper handle opening 74 is between the upper handle 72 and the cat litter body 20 of the cat litter container 10. The upper handle section 72 is located within the upper section 70 of the cat litter body 20 of the cat litter container 10. Optionally the upper handle 72 is part of first handle section wherein a lower portion 71 is affixed to interior surface 33 of rear surface wall 32, the upper handle opening 74 and interior wall 76 and supporting member 78 extending above top surface 37 of cat litter body 20. It is also within the spirit and scope of the present invention for the upper handle section 70 to be affixed to a rear surface 33, a front surface 30 or an interior of the front surface of cat litter body 20 as long as the upper handle opening 74 is exposed for grasping. Therefore, the upper handle 72 enables a person to have a hand grasp the top area of the cat litter container 10. FIG. 9 is a front elevational view of reinforcing member 78.

Referring to FIGS. 1-6, a second innovation is a side handle section 80 which is affixed within one side 38 of the cat litter container 10 and has a side handle 82 with spacer section 24 from the second sidewall 38 of cat litter body 20. The side handle 72 includes a side handle opening 84 surrounded by a interior side circumferential wall 86 which is protected by reinforcing member 88.

The second or side handle 82 is bordered in part by a cat's tail 89 incorporated into the packaging design. The second or side handle 82 includes a second side reinforcing member 88 which is a plastic strengthening member affixed onto the interior side circumferential wall 86 and reinforcing member 88 surrounding side handle opening 84. The side handle 72 includes a plastic reinforcing member 88 and interior side circumferential wall 86 with the side handle opening 84 which enables a person's fingers to be inserted through the side handle opening 84 and then the palm and fingers of the hand wrapped around the interior side circumferential wall 86 and second strengthening member 88 of second or side handle 82.

Figure 2:
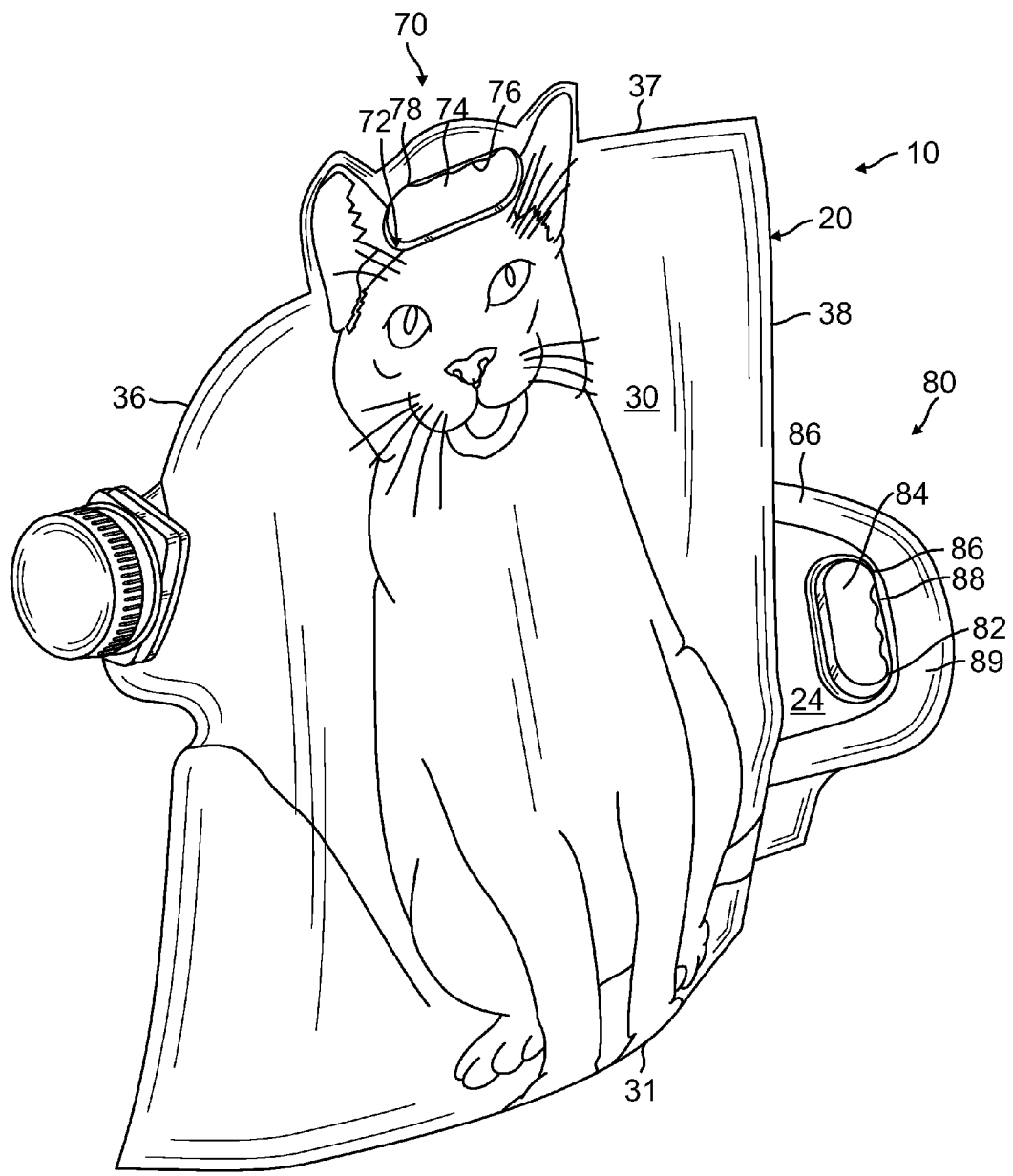
FIG. 2 is a front and side perspective view of the present invention cat litter container with two handles and a pouring spout showing the present invention.
Figure 3:
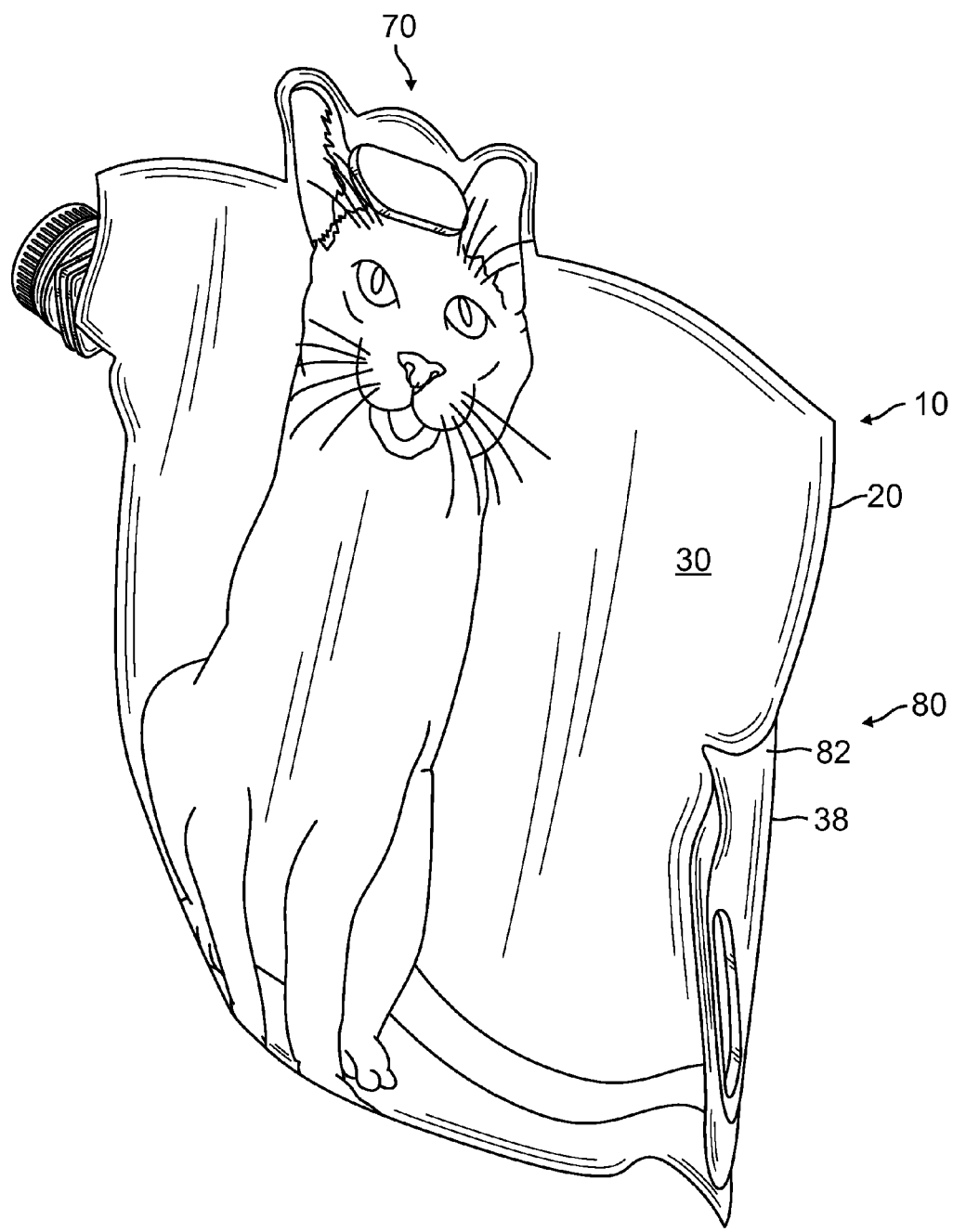
FIG. 3 is a rear and side perspective view of the present invention cat litter container with two handles and a pouring spout showing the present invention.
Figure 4:
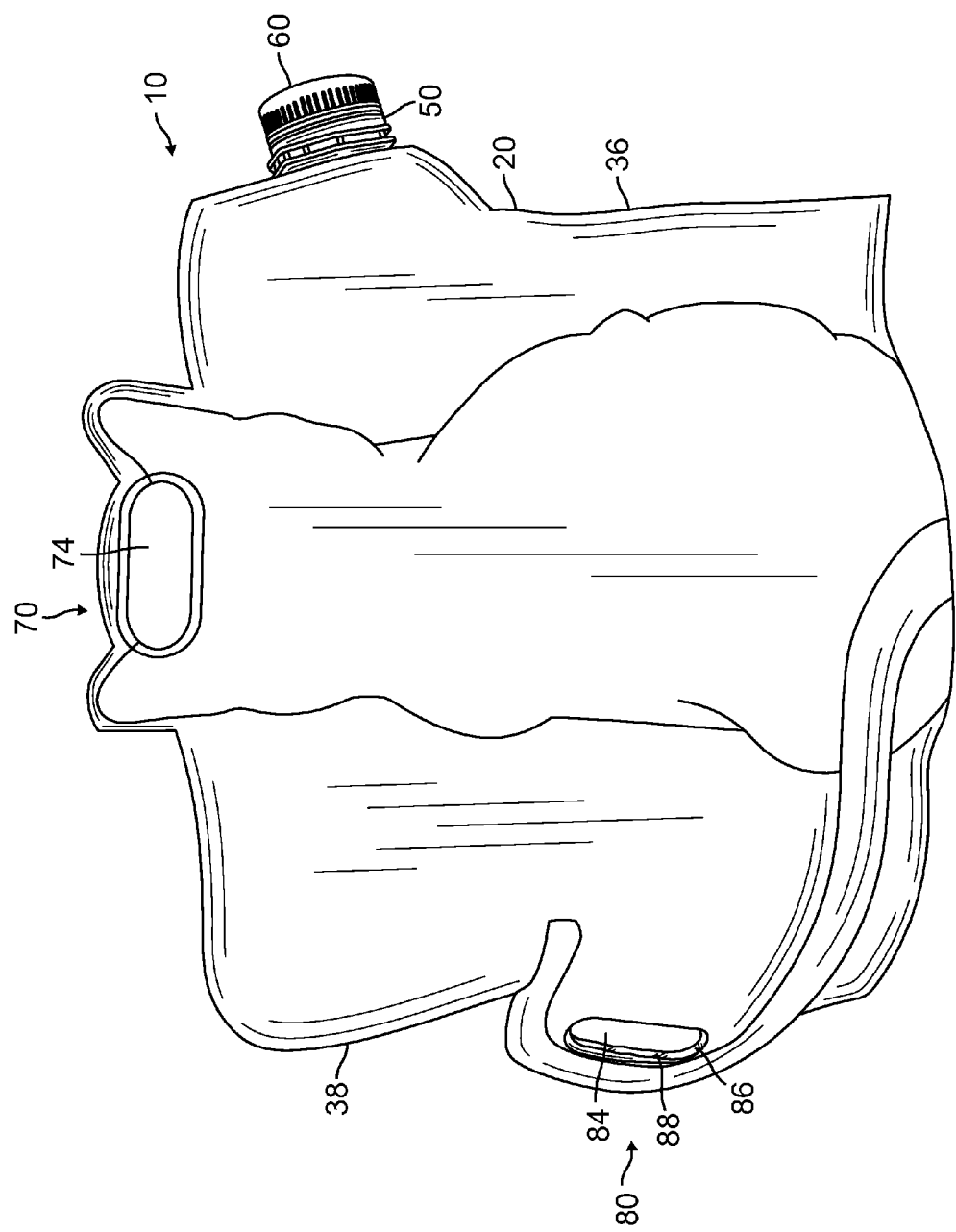
FIG. 4 is a rear elevational view of the present invention cat litter container with two handles and a pouring spout showing the present invention.
Figure 5:
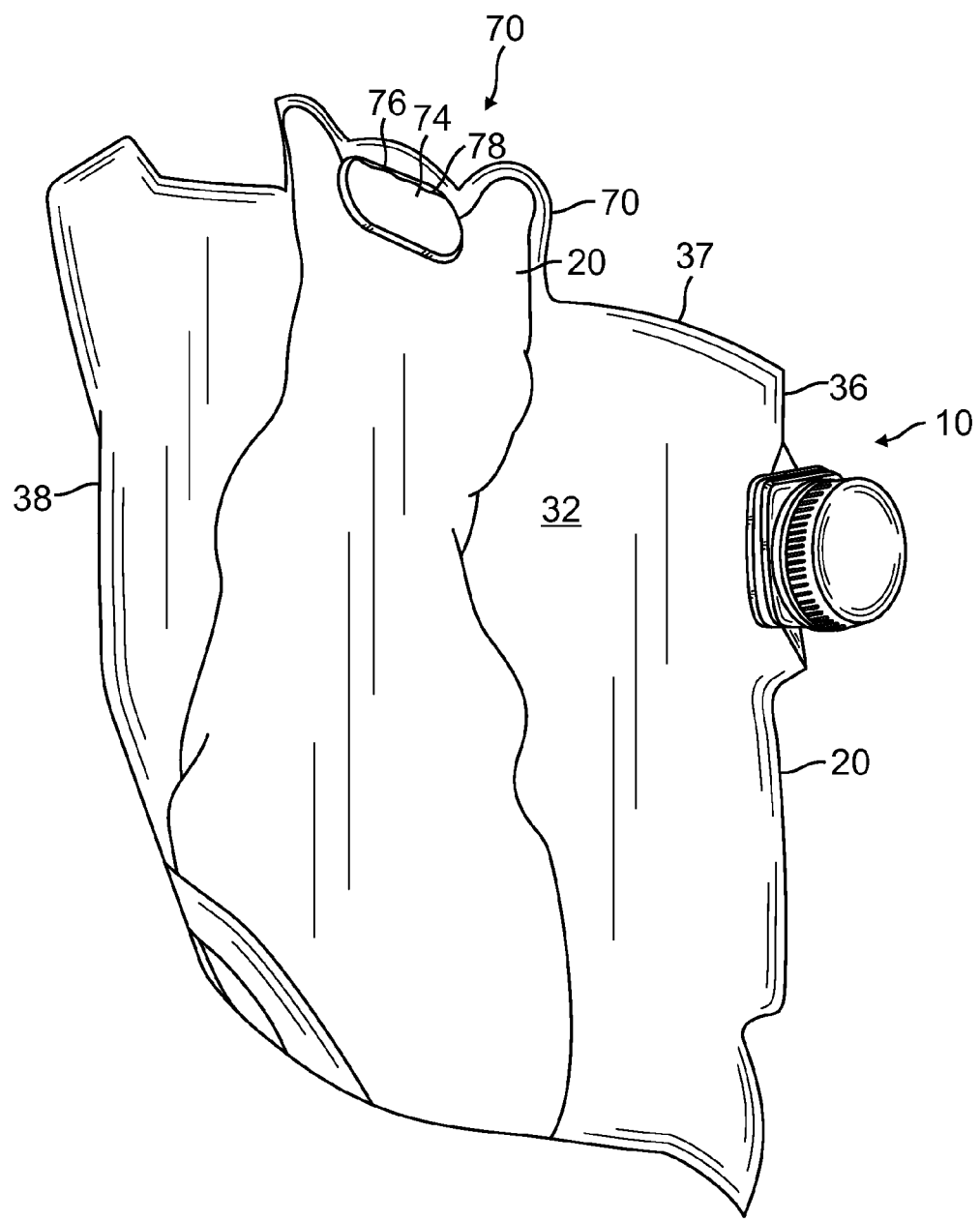
FIG. 5 is a rear and side perspective view of the present invention cat litter container with two handles and a pouring spout showing the present invention.
Figure 10:
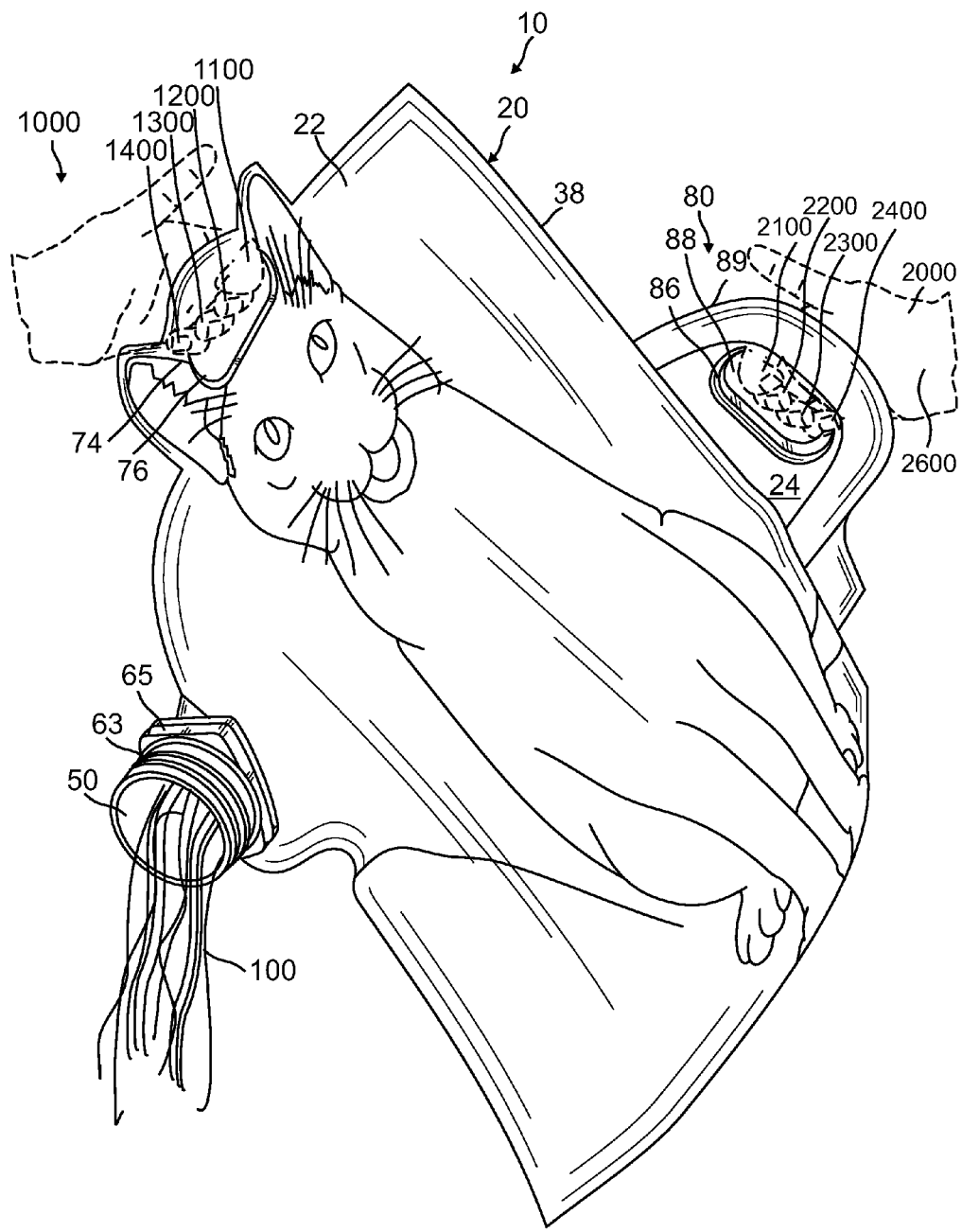
FIG. 10 is a rotated front and side perspective view of the present invention taken from FIG. 2, illustrating the present invention in use with a user's right hand fingers inserted through the opening in the top handle, the user's left hand fingers inserted through the opening in side handle, the cap removed from the pouring spout and the cat litter bag held with both hands and pouring cat litter out of the cat litter bag.

FIG. 10 is a rotated front and side perspective view of the present invention taken from FIG. 2, illustrating the present invention in use with a user's left hand fingers inserted through the upper handle opening 74 in the top of upper handle 72, the user's right hand fingers inserted through the side handle opening 84 in the side handle 82, the cap removed from the pouring spout and the cat litter bag held with both hands and pouring cat litter 100 out of the cat litter container 10.

Referring to FIGS. 1, 6 and 10, side handle 82 is illustrated with a right 2000 with fingers 2100, 2200, 2300 and 2400 inserted through side handle opening 84 and the palm 2600 capable of being wrapped around side handle 82.

As illustrated in FIGS. 1, 6 and 10, the location of this first handle section 70 which comprises upper handle 72 and the upper handle opening 74 surrounding by the interior upper circumferential wall 76 and strengthening member 78 of the upper handle 72 affixed to the cat litter body 20 of the cat litter container 10, is located within the upper section 70 of the cat litter body 20 of the cat litter container 10. Therefore, upper handle 72 enables a person to have a hand grasp the top area of the cat litter container 10.

Therefore, a left hand 1000 of a user is inserted into the upper handle opening 74 so that the person's fingers 1100, 1200, 1300, and 1400 are inserted through upper handle opening 74 and wrapped around interior upper circumferential wall 76 and strengthening member 78 of upper handle 72 within cat litter body 20 so that the cat litter container can be retained by two hands, one hand such as left hand 1000 wrapped around first upper handle 72 and the right hand 2000 wrapped around second or side handle 82. A preferred location for the side handle portion is within a space 24 extending from first sidewall 38 of the cat litter body 20 of the cat litter container 10 with the cat's tail 89 serving as a portion of the side handle 82. In the design, the second side handle 82 is partially bounded by a portion of the cat's tail 89. By way of example, a person can retain first upper handle 72 through upper handle opening 74 by inserting the fingers of the left hand through upper handle opening 74 and wrapping the palm and hand around circumferential wall 76 and reinforcing member 78 to grasp upper handle 72. With the opposite right hand, the person places the fingers of the right hand through side handle opening 84 and wraps the hand around side handle 82 so that the cat litter container 10 can be lifted and tilted so that the cat litter 100 can easily be poured out of the cat litter container after the removable closure member 60 has been removed from the pouring spout 50 and optionally the frangible seal 54 has been broken as illustrated in FIG. 10.

While described as a container for cat litter, it is also within the spirit and scope of the present invention for the container to be used in conjunction with other pet industry related products.

Further referring to FIG. 7, there is a cross-sectional view taken along 7-7 of FIG. 1, showing the opening 52 of the spout 50. Further referring to FIG. 8, in addition and optionally, the opening 52 of the spout 50 can have a frangible seal 54 affixed to the spout opening 52 so that the frangible seal 54 can be punctured when the cat litter container is in use but the frangible seal 54 provides an extra security to be sure no cat litter falls out of the cat litter container when it is in storage or positioned on sale on the shelf. Further referring to FIG. 9 is a cross-sectional view illustrating the interior chamber 40 of the cat litter container with cat litter 100 therein.

Referring to FIGS. 1-5, with respect to artistic design, the cat litter container 10 can have a picture of a cat 90 with narrow spaced apart ears 92L and 92R as illustrated and the tail can also be used as part of the design for the side handle retaining member.

Figure 11:
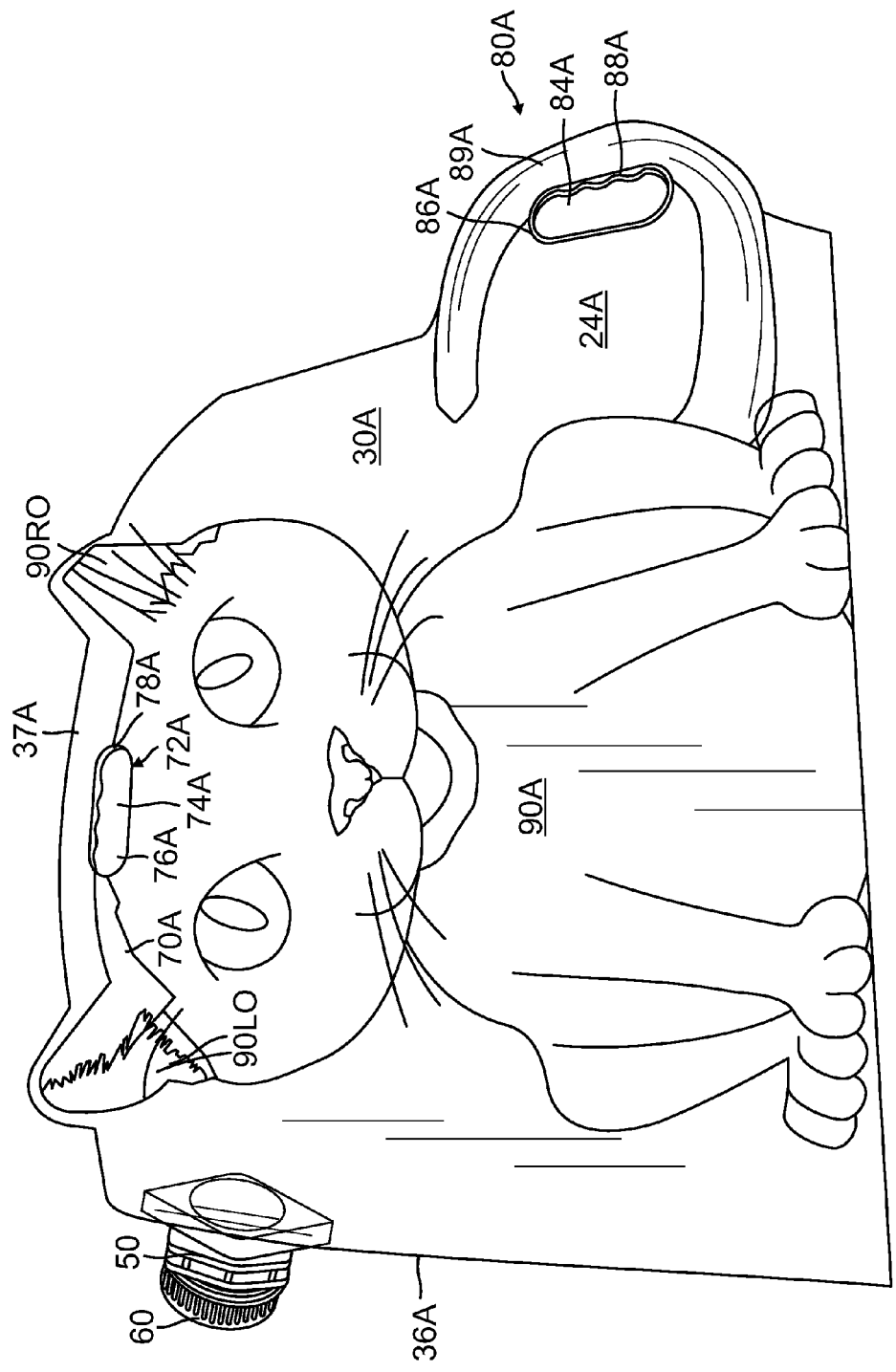
FIG. 11 is a front elevational view of an alternative embodiment of the present invention cat litter container with two handles and a pouring spout showing an alternative embodiment of the present invention.
Figure 12:
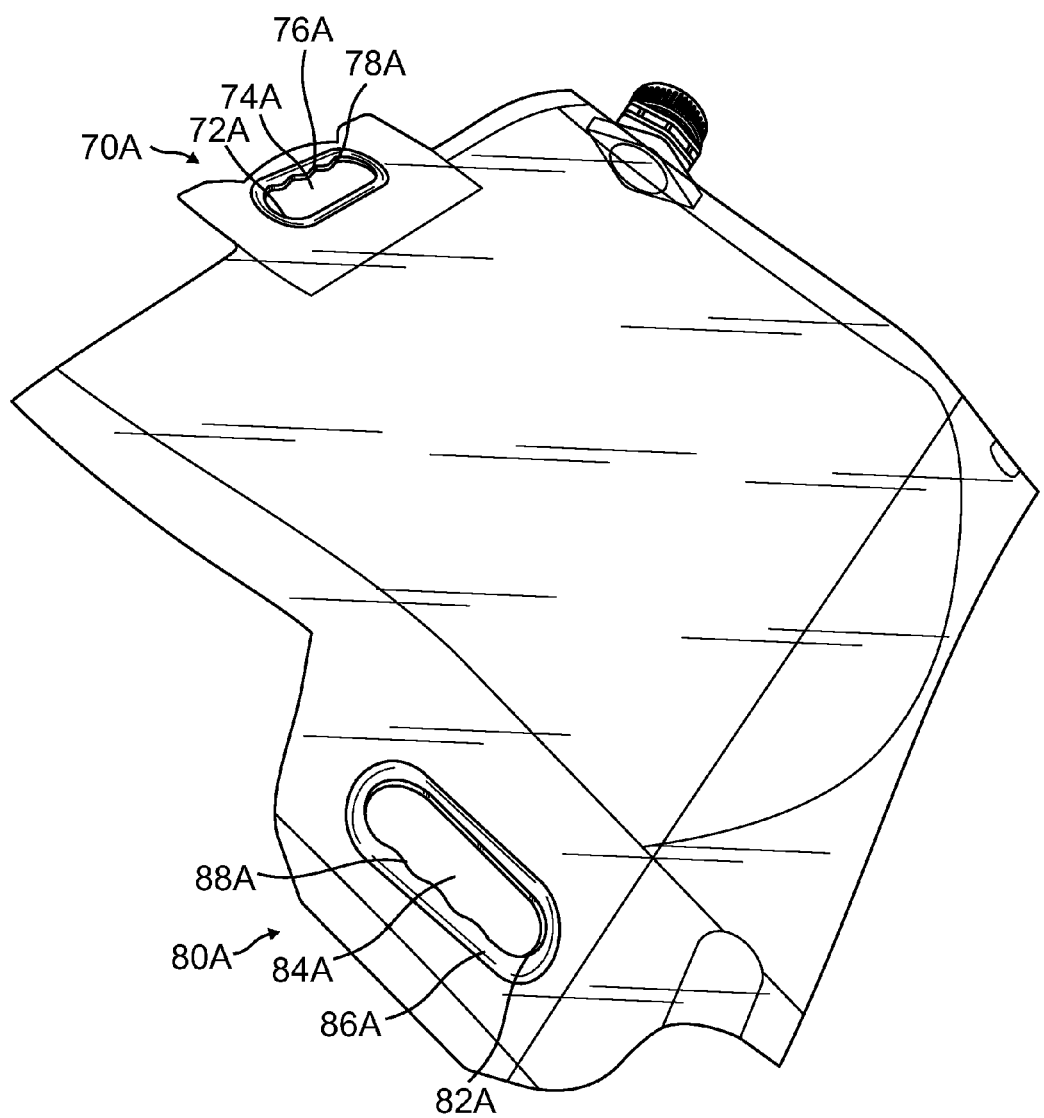
FIG. 12 is a transparent side perspective view of the alternative embodiment of the present invention.

Referring to FIG. 11, there is illustrated an alternative embodiment of the cat litter container 10A has a wider cat design 90A with wider ears 92LA 92RA. The components are the same and numbered with an "A" after each visible component. FIG. 12 is a transparent view of the alternative embodiment.

Therefore, through the present invention, the cat litter container can be much more efficiently grasped with two hands and cat litter dispensed through a spout.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A container used in conjunction with cat litter, the container comprising:
   a. a body having exterior walls including a front surface, a rear surface, a first sidewall surface, a second sidewall surface, a top surface and a bottom surface encircling an interior chamber;
   b. an upper handle section having a lower portion and an upper portion, the lower portion affixed at an upper section of the body and the upper portion extending above the top surface to expose an upper handle including an opening surrounded by an interior upper circumferential wall with an upper reinforcing member affixed onto the interior upper circumferential wall, the container including a design of a cat's ears extending upwardly to be on either side of the opening in the upper handle;
   c. a side handle section including a spacer section between the second sidewall and a side handle to expose the side handle including an opening surrounded by an interior side circumferential wall with a side reinforcing member affixed onto the interior side circumferential wall; and
   d. the body containing a pouring spout affixed into the first sidewall, the pouring spout in fluid communication with said interior chamber, the pouring spout including a threaded cap;
   e. whereby cat litter is retained in said interior chamber and when said threaded cap is removed, the container is held by a user inserting fingers of a first hand through said opening in said upper handle and a palm of the first hand around said upper handle and the container is further held by a user inserting fingers of a second hand through said opening in said side handle and the palm of a second hand around said side handle, and cat litter is poured out of said pouring spout while the container is held by two separate hands.

2. The container in accordance with claim 1, further comprising: a pouring spout frame retaining the pouring spout onto said first sidewall.

3. The container in accordance with claim 1, further comprising: the pouring spout is a hollow cylinder in fluid communication with said interior chamber of the container, the pouring spout having an internal diameter between one inch and three inches.

4. The container in accordance with claim 1, further comprising: the container body is made out of material selected from the group consisting of soft plastic and hard plastic.

5. The container in accordance with claim 1, further comprising: the container includes a design of a cat on at least said front wall, the design of a cat including a physical tail extending from said second sidewall and extending around said side handle section.

6. A container used in conjunction with cat litter, the container comprising:
   a. a body having exterior walls enclosing an interior chamber;
   b. an upper handle section affixed adjacent an upper wall section of said exterior walls and including an upper handle positioned out of said body to expose an opening surrounded by an interior upper circumferential wall;
   c. a side handle section including a spacer section affixed to and located between a second sidewall and a side handle to expose an opening surrounded by an interior side circumferential wall;
   d. the body containing a pouring spout affixed into a portion of said exterior walls remote from said side handle, the pouring spout in fluid communication with said interior chamber; and
   e. the container includes a design of a cat on at least one of said exterior walls, the design of a cat including a physical tail extending from said container body and extending around said side handle; and
   f. whereby cat litter is retained in said interior chamber and the container is held by a user inserting fingers of a first hand through said opening in said upper handle and the user inserting fingers of a second hand through said opening in said side handle, and cat litter is poured out of said pouring spout while the container is held by at least fingers of two separate hands.

7. The container in accordance with claim 6, further comprising: a pouring spout frame retaining the pouring spout onto the container.

8. The container in accordance with claim 7, further comprising: a cap enclosing said pouring spout.

9. The container in accordance with claim 8, further comprising: the cap is retained onto the pouring spout by an apparatus selected from the group consisting of mating threads on the pouring spout and the cap being threaded onto the mating threads of the pouring spout and the cap is press fit retained onto the pouring spout.

10. The container in accordance with claim 9, further comprising: the pouring spout further including a frangible seal covering the opening of the pouring spout prior to the insertion of the cap to close the pouring spout.

11. The container in accordance with claim 6, further comprising: said side handle section including a spacer section affixed to and located between a second sidewall and a side handle to expose an opening surrounded by an interior side circumferential wall with a side reinforcing member affixed onto the interior side circumferential wall.

12. The container in accordance with claim 6, further comprising: said upper handle section affixed adjacent an upper wall section of said exterior walls and including an upper handle positioned out of said body to expose an opening surrounded by an interior upper circumferential wall with an upper reinforcing member affixed onto the interior upper circumferential wall.

13. The container in accordance with claim 6, further comprising: the pouring spout is in fluid communication with the interior chamber and the pouring spout is a hollow cylinder having an interior diameter between one inch and three inches.

14. The container in accordance with claim 6, further comprising: the container body is made out of material selected from the group consisting of soft plastic and hard plastic.

15. The container in accordance with claim 6, further comprising: a reinforcing member affixed onto the interior upper circumferential wall.

16. The container in accordance with claim 6, further comprising: a side reinforcing member affixed onto the interior side circumferential wall.

\* \* \* \* \*